(12) United States Patent
Schabenberger et al.

(10) Patent No.: US 11,473,358 B2
(45) Date of Patent: Oct. 18, 2022

(54) HINGE ASSEMBLY FOR AN ENGINE HOOD OF A MOTOR VEHICLE AND MOTOR VEHICLE

(71) Applicant: AUDI AG, Ingolstadt (DE)

(72) Inventors: Richard Schabenberger, Münchsmünster (DE); Norman Dix, Ingolstadt (DE); Bernhard Hüttinger, Böhmfeld (DE)

(73) Assignee: AUDI AG, Ingolstadt (DE)

( * ) Notice: Subject to any disclaimer, the term of this patent is extended or adjusted under 35 U.S.C. 154(b) by 589 days.

(21) Appl. No.: 16/477,434

(22) PCT Filed: Feb. 27, 2018

(86) PCT No.: PCT/EP2018/054822
§ 371 (c)(1),
(2) Date: Jul. 11, 2019

(87) PCT Pub. No.: WO2018/162284
PCT Pub. Date: Sep. 13, 2018

(65) Prior Publication Data
US 2019/0383074 A1    Dec. 19, 2019

(30) Foreign Application Priority Data

Mar. 9, 2017    (DE) ..................... 10 2017 002 251.8

(51) Int. Cl.
*B60R 21/34*    (2011.01)
*E05D 3/02*    (2006.01)
(Continued)

(52) U.S. Cl.
CPC .............. *E05D 11/00* (2013.01); *B60R 21/34* (2013.01); *E05D 3/02* (2013.01); *E05D 3/145* (2013.01);
(Continued)

(58) Field of Classification Search
CPC ... B60R 21/34; B60R 21/38; B60R 2021/343; E05D 3/02; E05D 3/14; E05D 3/145; E05D 2011/009
See application file for complete search history.

(56) References Cited

U.S. PATENT DOCUMENTS 5,557,829 A * 9/1996 Schoen ................... E05D 11/06
16/371
8,595,901 B1 * 12/2013 Shaw ...................... E05D 5/062
296/193.11
(Continued)

FOREIGN PATENT DOCUMENTS

DE          100 35 105 A1    6/2001
DE    10 2008 034 097 A1    1/2010
(Continued)

OTHER PUBLICATIONS

International Search Report and Written Opinion dated Jun. 13, 2018 in corresponding International Application No. PCT/EP2018/054822; 24 pages.
(Continued)

*Primary Examiner* — Barry Gooden, Jr.
(74) *Attorney, Agent, or Firm* — Maier & Maier, PLLC

(57) ABSTRACT

A hinge assembly for an engine hood of a motor vehicle, having a hinge substructure, which can be attached to a body component of the motor vehicle, and having a hinge upper part, which can be attached to the engine hood. The hinge upper part is retained on the hinge substructure so as to pivot about a pivoting axis. The hinge assembly includes at least one support element, which enables deformation of the hinge substructure in a first direction, in which the hinge substructure can be moved away from a limit stop area of the at least one support element. The at least one support element limits deformation of the hinge substructure in a second direction opposite the first direction by means of the
(Continued)

limit stop area. Furthermore, the invention relates to a motor vehicle having at least one such hinge assembly.

7 Claims, 6 Drawing Sheets

(51) Int. Cl.
 *E05D 11/00* (2006.01)
 *E05D 3/14* (2006.01)
(52) U.S. Cl.
 CPC ... *B60R 2021/343* (2013.01); *E05D 2011/009* (2013.01); *E05Y 2900/536* (2013.01)

(56) References Cited

U.S. PATENT DOCUMENTS

| | | | | |
|---|---|---|---|---|
| 8,899,363 B1* | 12/2014 | LaPorte | ................ | B62D 25/12 180/69.2 |
| 10,703,326 B2* | 7/2020 | Gabler | ................ | B60R 21/38 |
| 2002/0011365 A1* | 1/2002 | Sasaki | ................ | B60R 21/38 180/69.2 |
| 2007/0062748 A1* | 3/2007 | Erwin | ................ | E05D 11/00 180/69.21 |
| 2008/0034552 A1* | 2/2008 | Nguyen | ................ | E05D 3/145 16/374 |
| 2008/0156556 A1* | 7/2008 | Takahashi | ............. | B62D 25/12 180/69.21 |
| 2008/0174124 A1* | 7/2008 | Takahashi | ............. | B60R 21/34 292/45 |
| 2009/0302644 A1* | 12/2009 | Mori | ................ | B60R 21/38 296/193.11 |
| 2010/0005628 A1 | 1/2010 | Jung | | |
| 2010/0101048 A1* | 4/2010 | Thomas | ................ | E05D 11/00 16/221 |
| 2010/0140005 A1* | 6/2010 | Kisiler | ................ | E05D 3/02 16/221 |
| 2012/0084942 A1* | 4/2012 | Mehta | ................ | B60R 21/38 16/349 |
| 2013/0227818 A1* | 9/2013 | Zippert | ................ | B60R 21/38 16/366 |
| 2014/0026369 A1* | 1/2014 | Kim | ................ | B60R 21/34 16/387 |
| 2014/0312653 A1* | 10/2014 | Lindmark | ............... | B60R 21/34 296/187.04 |
| 2016/0144822 A1* | 5/2016 | Kim | ................ | B60R 21/34 16/222 |
| 2016/0186472 A1* | 6/2016 | Young | ................ | B62D 25/14 296/193.06 |
| 2016/0245003 A1* | 8/2016 | McIntyre | ................ | B60R 21/38 |
| 2017/0113648 A1* | 4/2017 | Kim | ................ | B60R 21/38 |
| 2018/0056927 A1* | 3/2018 | Yamada | ................ | E05D 3/125 |
| 2019/0299921 A1* | 10/2019 | Maeda | ................ | E05D 3/145 |
| 2019/0308666 A1* | 10/2019 | Rahman | ................ | E05D 11/00 |
| 2019/0375369 A1* | 12/2019 | Hufen | ................ | B60R 21/38 |
| 2020/0087959 A1* | 3/2020 | Schabenberger | ..... | E05D 7/0045 |
| 2021/0129789 A1* | 5/2021 | Steinbrecher | ........... | E05D 11/06 |
| 2022/0074247 A1* | 3/2022 | Kamada | ................ | E05D 5/043 |

FOREIGN PATENT DOCUMENTS

| | | |
|---|---|---|
| DE | 102014001948 A1 | 8/2014 |
| DE | 102014012196 A1 | 2/2016 |

OTHER PUBLICATIONS

Response to International Written Opinion filed on Sep. 27, 2018 in corresponding International Application No. PCT/EP2018/054822; 19 pages.
International Written Opinion dated Feb. 12, 2019 in corresponding International Application No. PCT/EP2018/054822; 10 pages.
Response to International Written Opinion filed on Apr. 10, 2019 in corresponding International Application No. PCT/EP2018/054822; 18 pages.
German Examination Report dated Sep. 4, 2017 in corresponding German Application No. 10 2017 002 251.8; 16 pages.
European Office Action dated Dec. 16, 2020, in connection with corresponding EP Application No. 18 710 788.3 (10 pp., including machine-generated English translation).
Notification of Transmittal of Translation of the International Preliminary Report on Patentability dated Sep. 12, 2019, in connection with corresponding International Application No. PCT/EP2018/054822 (6 pgs ).

* cited by examiner

HINGE ASSEMBLY FOR AN ENGINE HOOD OF A MOTOR VEHICLE AND MOTOR VEHICLE

FIELD

The disclosure relates to a hinge assembly for an engine hood of a motor vehicle, having a hinge substructure, which can be attached to a body component of the motor vehicle, and having a hinge upper part, which can be attached to the engine hood. The hinge upper part is retained on the hinge substructure so as to pivot about a pivoting axis. Furthermore, the disclosure relates to a motor vehicle having such a hinge assembly.

BACKGROUND

Hinge for an engine hood of a motor vehicle is described, for example, in DE 10 2014 012 196 A1. The hinge comprises a hinge lower part, which is to be attached to the body of the motor vehicle, and a hinge upper part, which is to be attached to the engine hood. The hinge lower part and the hinge upper part are connected to one another so as to pivot about a pivoting axis. The hinge lower part is reinforced by means of a reinforcement rib.

Furthermore, such an increase in stiffness of the hinge lower part can be achieved by means of a flange, a material thickening, or beading. By means of such reinforcements, the strength properties of the hinge change in all directions of movement of the hinge.

DE 10 2014 001 948 A1 describes a hinge to attach, in a pivoting manner, an engine hood to a body of a vehicle, wherein the hinge is attached to the engine hood by means of a first part and attached to the body by means of a second part.

However, legally stipulated pedestrian protection requires that single-pivot hinges for engine hoods be designed as relatively unstable systems which can collapse in a controlled manner. For example, there is a crash test (collision test), in which a collision of the motor vehicle with a pedestrian is simulated. In doing so, a ball impacts the engine hood from above. With the load stimulated in this collision test, the hinge should be able to yield such that the hinge substructure bends toward the vehicle inner side.

On the other hand, high stiffness of the hinge is required for other load cases associated with an impact of the motor vehicle. This is so that as few components or attachment parts of the motor vehicle as possible are damaged. Furthermore, the high stiffness of the hinge lower part is intended to prevent penetration of the engine hood into the windshield of the motor vehicle.

Accordingly, it has proven to be difficult to fulfill both the requirements of pedestrian protection as well as, at the same time, the requirements of high stiffness of the hinge.

Thus, the object of the present invention is to obtain a hinge assembly of the aforementioned type which is improved with respect to the stiffness requirements and to provide a motor vehicle with such a hinge assembly.

The hinge assembly according to the invention for an engine hood of a motor vehicle comprises a hinge substructure, which can be attached to a body component of the motor vehicle. A hinge upper part of the hinge assembly can be attached to the engine hood. The hinge upper part is retained on the hinge substructure so as to pivot about a pivoting axis. The hinge assembly comprises at least one support element, which enables deformation of the hinge substructure in a first direction, in which the hinge substructure can be moved away from a limit stop area of the at least one support element. Due to the limit stop area, the at least one support element limits the deformation of the hinge substructure in a second direction opposite the first direction.

Thus, the hinge substructure is not connected to the support element in the limit stop area. The hinge assembly can thereby collapse in a controlled manner in that the hinge substructure is deformed such that an area of the deforming hinge substructure moves away from the limit stop area. The hinge substructure can thus bend in the first direction, particularly during an impact force due to an accident, for example in a collision of the motor vehicle with a pedestrian whose head impacts the engine hood.

It can thereby be assured that the minimal stiffness requirements are fulfilled which are to be provided for the purposes of pedestrian protection. On the other hand, the at least one support element blocks the hinge assembly with respect to a deformation of the hinge substructure, at least in the second direction. Thus, the stiffness of the hinge assembly is increased in this second direction. This means that, in the event of an impact of the motor vehicle having the hinge assembly, as few attachment parts or components of the motor vehicle as possible are damaged despite fulfilling the requirements for pedestrian protection. For example, improved protection of a side panel frame of the motor vehicle, a fender of the motor vehicle, and the like can be assured.

Accordingly, the hinge assembly is improved with respect to the stiffness requirements.

The at least one support element can be connected to the hinge substructure in an attachment area spaced apart from the limit stop area. The hinge assembly can then be provided as an especially compact and prefabricated component, which has the increased stiffness and/or strength in the second direction. In addition, tolerances in designing the hinge assembly can be kept especially low.

In addition or as an alternative, the at least one support element is connected to the body component and/or a further body component in an attachment area spaced apart from the limit stop area. In addition, the one-sided stiffness increase in the hinge substructure can be simply and reliably ensured by means of such a support element, which is particularly separate from the hinge substructure. Furthermore, no changes then have to be made to an existing hinge, which comprises the hinge upper part in the hinge substructure, in order for the stiffness increase in the hinge assembly to be achieved in the second direction.

In the installation position of the hinge assembly, the at least one support element preferably enables deformation of the hinge substructure toward the vehicle inner side. In contrast, the deformation of the hinge substructure in the second direction, i.e. toward the vehicle outer side, is then limited by the at least one support element.

The at least one support element preferably furthermore enables a deflection or deformation of the hinge substructure in other directions different from the second direction. Accordingly, the deformation of the hinge substructure is reduced, particularly only unidirectionally. This in turn means that the adjacent components of the motor vehicle remain free of damage, to the extent possible, when the hinge assembly is impacted with a force acting in the second direction.

In particular, the one-sided increase in the stiffness of the hinge assembly or the hinge system can ensure that there are lower stiffness values of the hinge assembly in all of the remaining directions, different from the second direction, than in the second direction, in an advantageous manner. Thus, stiffnesses or strengths that are beneficial with respect to pedestrian protection can be achieved for the hinge assembly.

When the at least one support element fits closely with the hinge substructure in the limit stop area, the deformation of the hinge substructure is limited to a certain extent in the second direction, namely limited to zero.

The hinge substructure can be formed as a hinge lower part of a single-pivot hinge. The hinge upper part is then retained directly on the hinge lower part so as to pivot about the pivoting axis. Such a hinge assembly is constructed especially simply.

Alternatively, the hinge substructure may comprise a hinge base body, which can be attached to the body component of the motor vehicle, and at least one intermediate link. The at least one intermediate link is connected to the hinge base body on one side so as to pivot and connected to the hinge upper part on the other side so as to pivot. In this case, the at least one support element enables the deformation of the at least one intermediate link in the first direction, and the at least one support element limits the deformation in the second direction by means of the limit stop area. With this design of the hinge assembly as a multi-pivot hinge, the hinge upper part is thus indirectly attached, namely by means of the at least one intermediate link, to the hinge base body. The one-sided stiffness increase by means of the at least one support element is advantageous with such a multi-pivot hinge as well.

Preferably, the at least one support element is formed as a plate, which is aligned in the direction of the pivoting axis, at least in areas. Such a support element enables the one-sided increase in the stiffness of the hinge substructure to be achieved especially simply and with low effort. In addition, the stiffness of the hinge assembly can be increased in the second direction to a large degree by means of a plate-shaped section of the support element or such a plate, the opposing surfaces of which are oriented in the direction of the pivoting axis.

In particular, when the at least one support element is connected to the body component or the further body component, it has been shown to be advantageous when the at least one support element with the limit stop area fits closely with the hinge substructure. This is because this attachment of the support element to the body component enables the mounting first of the hinge substructure and then the attachment of the support element to the body component. This enables the support element or the support part to be positioned very precisely in relation to the hinge substructure and particularly without a gap between the support element and the hinge substructure.

Furthermore, particularly good corrosion protection of the hinge substructure can be achieved by means of this separate formation and attachment of the at least one support element. Due to the absence of the support element during a painting process, in which the motor vehicle is painted together with the hinge substructure, a contact point of the hinge substructure is also painted, in which the support element can fit closely with or adjoin the hinge substructure, thus avoiding a paint flaw. The support element itself is preferably painted or it is coated with a protective coating before installation as a single part. Furthermore, in order to provide improved corrosion protection, the at least one support element can be provided with paint and subsequently attached to the body component. Corrosion can then be avoided, particularly extensively, despite the close fit of the support element with the hinge substructure.

At least one support element can fit closely with the hinge substructure, particularly with pretension. The deformation of the hinge substructure in the second direction is thereby suppressed to a significant degree.

Preferably, the limit stop area is an end area of the at least one support element. The properties of the support element, which lead to the reinforcement of the hinge assembly in the second direction, can thereby be achieved with an especially low weight of the hinge assembly.

A slight spacing may be present between the limit stop area of the at least one support element and the non-deformed hinge substructure. The spacing in this case is to be measured, in particular, such that the applying of a layer providing the corrosion protection to the support element is also possible in the limit stop area. Corrosion of the hinge assembly can thereby be avoided.

It has proven to be further advantageous when the at least one support element comprises a metallic base body, which is equipped with a panel attached to the base body in the limit stop area. The panel in this case fits closely with the hinge lower part. In this manner, it can be ensured that minimal spacing is present between the non-deformed hinge substructure and the base body before attachment of the panel to the metallic base body. The spacing in turn enables the base body to be provided with a coating to protect against corrosion. For example, the base body can be galvanized just as the hinge substructure in order to ensure corrosion protection.

Due to the close fit of the panel with the non-deformed or not yet deformed hinge substructure, the deformation of the hinge substructure can be limited particularly extensively in the second direction. In addition, the occurrence of noise, for example during driving operation of the motor vehicle equipped with the hinge assembly, for example due to vibrations, can be avoided.

Preferably, the panel is formed as a cover formed from at least one plastic. This simplifies the attachment of the panel to the base body in the limit stop area and the base body is simultaneously protected by the cover. Furthermore, this design is advantageous with respect to the suppression of corrosion of the support element.

When the at least one support element comprises the metallic base body, the base body can be formed as a single part with the hinge substructure and/or with the body component. For example, the base body can be provided by deformation of the hinge substructure and/or the body component. Accordingly, the base body is then provided especially easily and with low effort.

At least one support element may also be formed, as a whole, as a single piece with the hinge substructure and/or with the body component, for example by means of reshaping and/or casting.

The at least one support element may also be connected to the hinge substructure and/or to the body component, however, with friction-locking and/or by means of at least one connecting element. For example, a plate serving as the support element can be welded or bonded to the hinge substructure and/or to the body component. However, a connecting of the at least one support element with the hinge substructure and/or with the body component is also possible by means of bolting or the like. In particular, the hinge assembly can be thusly reinforced in the desired areas in an especially precise manner.

The motor vehicle according to the invention has at least one hinge assembly according to the invention. For example, a first hinge assembly may be provided on a driver side of the motor vehicle and a second hinge assembly may be provided on a front-passenger side of the motor vehicle, by means of which the engine hood of the motor vehicle is hinged to the body of the motor vehicle.

Preferably, the pivoting axis extends in the vehicle transverse direction, and the second direction points toward the outside of the motor vehicle. Thus, the stiffness increase in the hinge assembly can be achieved especially simply, in which the deformation of the hinge substructure is at least made more difficult, for example in the form of a bending or buckling toward the vehicle outer side.

The invention also includes further embodiments of the motor vehicle, which have features as they have already been described in association with the further embodiments of the hinge assembly. For this reason, the corresponding further embodiments of the motor vehicle are not described again here.

BRIEF DESCRIPTION OF THE DRAWINGS

An exemplary embodiment of the invention is described in the following. The following is shown.

DETAILED DESCRIPTION

The exemplary embodiment explained in the following refers to a preferred embodiment of the invention. With the exemplary embodiment, the described components of the embodiment represent individual features of the invention that are to be considered independently from one another, each of which also further develop the invention independently of one another and thus also are to be considered individually or in a combination that is different than the one shown as a component of the invention. Furthermore, the described embodiment can also be supplemented through further described features of the invention.

In the figures, elements which are functionally equivalent are each given the same reference numbers.

Figure 1:
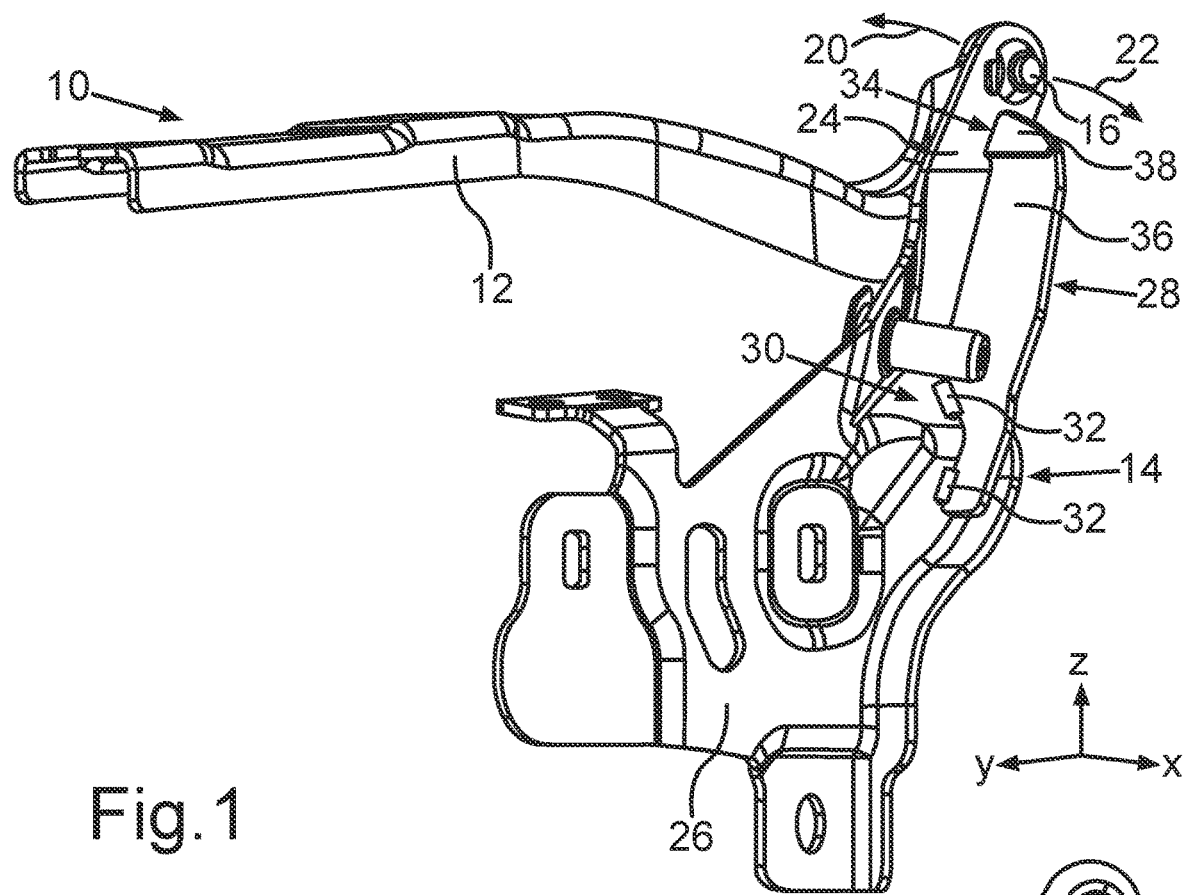
FIG. 1 shows, in perspective, a hinge for hinging an engine hood to a body of a motor vehicle, wherein a hinge lower part of the hinge is reinforced on one side.

FIG. 1 shows, in perspective, a hinge assembly 10, which serves to hinge an engine hood of a motor vehicle to a body of the motor vehicle. The hinge assembly 10 comprises a hinge upper part 12, which can be attached to the engine hood. In contrast, a hinge lower part 14 of the hinge assembly 10 can be attached to a body component of the motor vehicle, for example to a side member 42 of the motor vehicle (cf. FIG. 9). A hinge substructure of a single-pivot hinge is provided for the hinge assembly 10 shown in FIG. 1 by means of the hinge lower part 14. Accordingly, the hinge upper part 12 is directly retained on the hinge lower part 14 so as to pivot.

FIG. 1 shows an example of the hinge assembly 10, which serves to hinge the engine hood on a driver side of the motor vehicle. In particular, a corresponding but inversely formed hinge assembly 10 is provided on a front-passenger side of the motor vehicle. By means of a bolt 16, a pivoting axis 18 is provided (cf. FIG. 3), around which the hinge upper part 12 (and the engine hood with it) can be pivoted relative to the hinge lower part 14.

A first arrow in FIG. 1 indicates a first direction 20, which points toward the vehicle inner side, when the hinge assembly 10 is installed in the motor vehicle. In a similar manner, a second arrow in FIG. 1 indicates a second direction 22, which points toward the vehicle outer side, when the hinge assembly 10 is installed in the motor vehicle. Accordingly, the hinge lower part 14 in this case is arranged on the hinge upper part 12 on the outside of the vehicle.

This ensures that the hinge lower part 14 can deform comparatively slightly in the first direction 20, for example by buckling or bending of an end area 24 of the hinge lower part 14 in relation to the attachment section 26 of the hinge lower part 14, in which the hinge lower part 14 is attached to the body component. The bolt 16 passes through the hinge lower part 14 in the end area 24.

A deformation by means of the buckling or bending or such a collapsing of the hinge assembly 10 should result, for example, when the head of a pedestrian hit by the motor vehicle impacts the engine hood from above, i.e. opposite the vehicle vertical direction Z. Such a situation may result, for example, in a collision of the motor vehicle with the pedestrian. Accordingly, the hinge assembly 10 in this case is designed such that the hinge lower part 14 is comparatively slightly deformable in the first direction 20 in order to fulfill the requirements of pedestrian protection.

The second direction 22 is opposite the first direction 20. The hinge lower part 14 of the hinge assembly 10 has increased stiffness in the second direction 22 in this case. A support element 28 formed, for example, as a plate ensures this one-sided stiffness increase. In this case, the support element 28 is connected to the hinge lower part 14 in an attachment area 30. For example, weld seams 32, which serve as a friction-locking connection of the support element 28 to the hinge lower part 14, may be provided in the attachment area 30.

An end area of the support element 28 closer to the pivoting axis 18 is formed as a limit stop area 34 here. The support element 28 fits closely with the hinge lower part 14 in this limit stop area 34. In particular, the support element 28 with the limit stop area 34 fits closely with the latch-like end area 24 of the hinge lower part 14, through which the bolt 16 passes. However, the support element 28 is not connected to the hinge lower part 14 in the limit stop area 34. The limit stop area 34 may even be spaced apart from the hinge lower part 14 (cf. FIG. 5). Consequently, in the event of an impact force of the engine hood, as can occur in the manner previously mentioned, for example, during a collision with a pedestrian, the hinge lower part 14 can deform in the first direction 20 unencumbered.

In contrast, a deformation of the hinge lower part 14 in the second direction 22 is suppressed or at least limited by means of the limit stop area 34 of the support element 28. Thus, the support element 28 ensures a one-sided stiffness increase of the hinge lower part 14. This means that for other crash load cases, in which an impact force of the hinge assembly 10 takes place in the second direction 22, an especially high stiffness of the hinge lower part 14 is provided. This prevents attachment parts, such as a side panel frame or fender of the motor vehicle, from thereby becoming damaged as a result of such an impact force here. In addition, penetration of the engine hood into the windshield of the motor vehicle can thus be prevented. This is advantageous with respect to classification of the motor vehicle for comprehensive insurance purposes. However, pedestrian protection is still ensured by means of the hinge assembly 10. The hinge lower part 14 can be less deformed in other directions that are not the second direction 22 than in the second direction 22.

Figure 2:
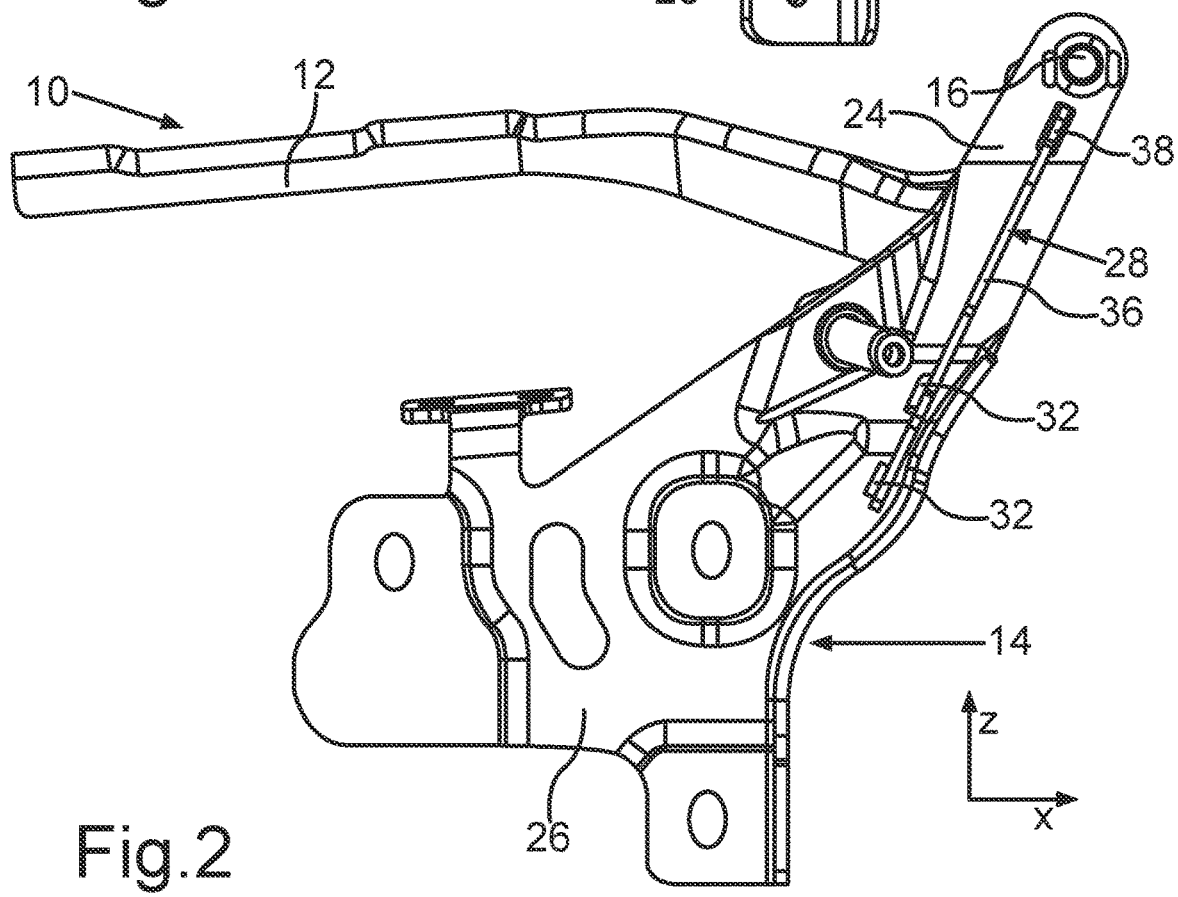
FIG. 2 shows the hinge according to FIG. 1 in a first side view.

FIG. 2 shows the hinge assembly 10 in a view in the vehicle transverse direction Y. From this view, it is clear that the support element 28 formed as a type of plate is formed tilted to the vehicle rear here in relation to the vehicle vertical direction Z and the vehicle longitudinal direction X. In addition, it is clear that the plate-shaped support element 28 is aligned vertically to the end area 24, in which the hinge lower part 14 is connected to the hinge upper part 12 so as to pivot by means of the bolt 16. Accordingly, the support element 28, which is formed as a plate here, is aligned in the direction of the pivoting axis 18.

Figure 3:
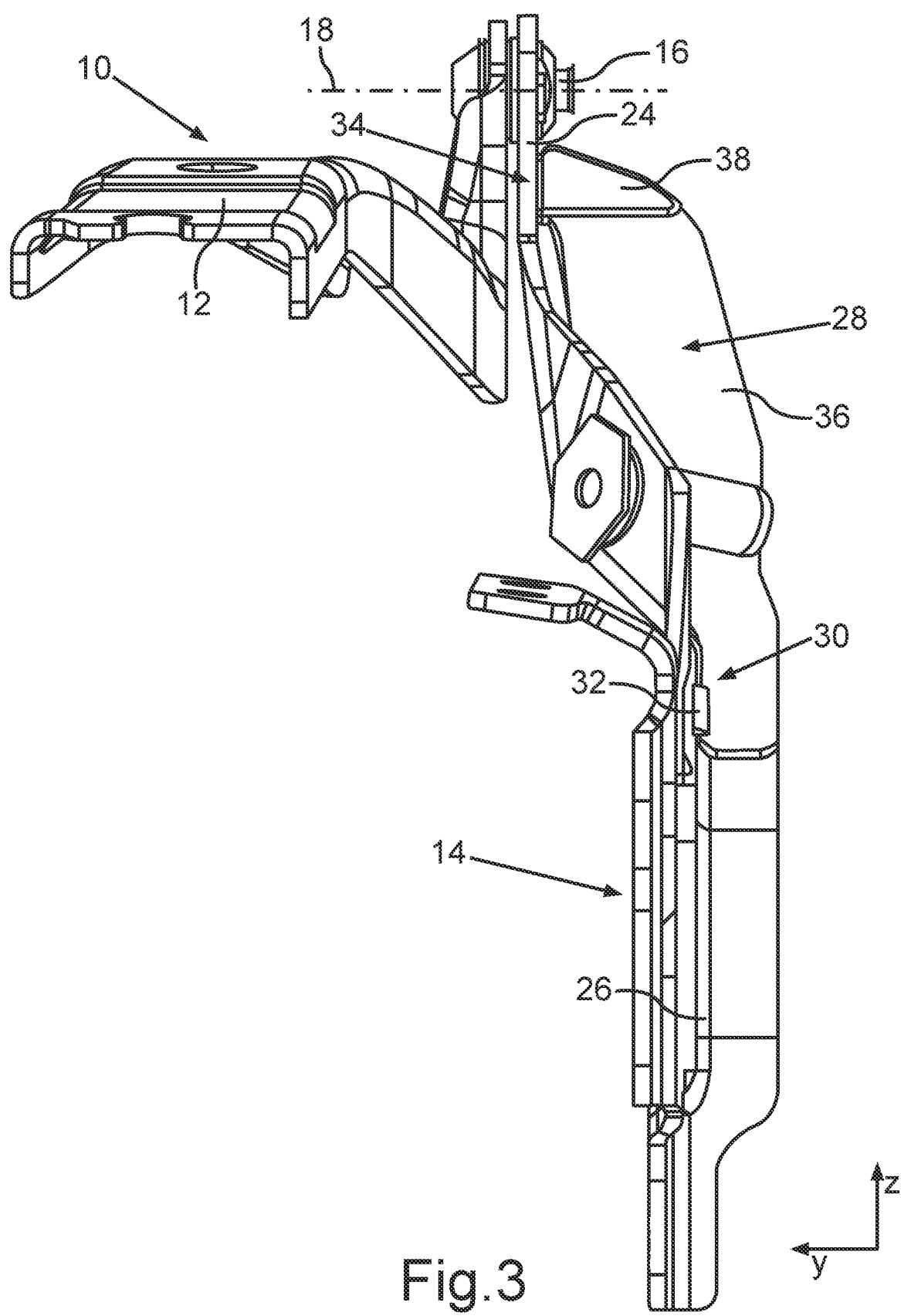
FIG. 3 shows the hinge according to FIG. 1 in a second side view.

From the view of the hinge assembly 10 in the direction of the vehicle longitudinal axis X according to FIG. 3, it can easily be seen that the support element 28 may have a base body 36 and a panel made of plastic formed as a cover 38. The limit stop area 34 of the support element 28 is provided by the cover 38 here. This embodiment makes it possible to provide the base body 36 with corrosion protection before attachment of the cover 38 to the base body 36, which is formed from metal here. Because, as long as the base body 36 has not been equipped with the cover 38, there will be a slight spacing between the base body 36 and the end area 24 of the hinge lower part 14. Accordingly, the base body 36 can also be galvanized, for example, in the area in which the cover 38 will subsequently be arranged or attached.

Figure 4:
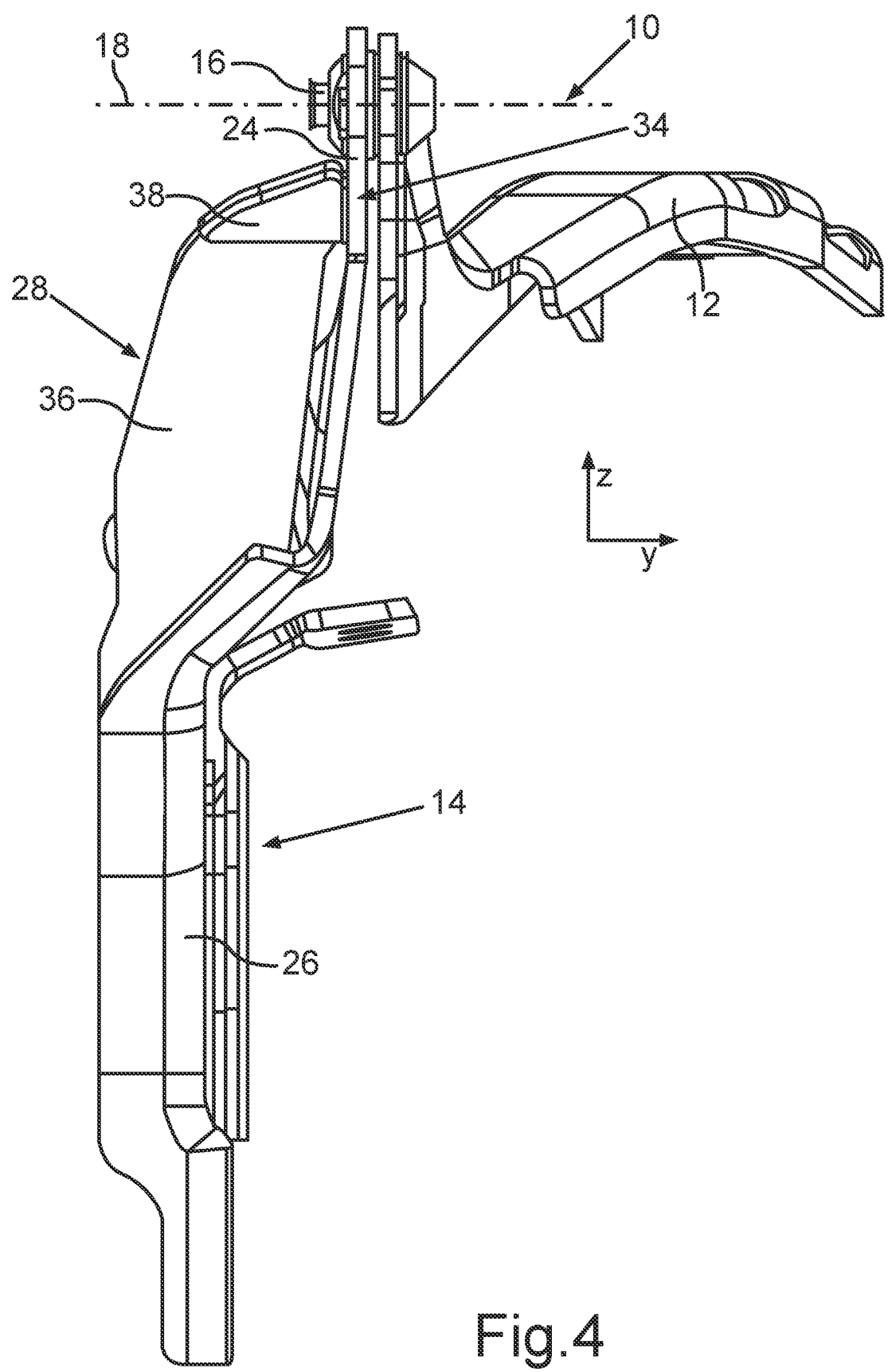
FIG. 4 shows the hinge according to FIG. 1 in a third side view.

FIG. 4 shows the hinge assembly 10 likewise in the vehicle longitudinal direction X; however, contrary to the view in FIG. 3, this is not in the driving direction of the motor vehicle but opposite the driving direction of the motor vehicle. From this view however, the close fit of the cover 38 with the hinge lower part 14 in the limit stop area 34 can be easily seen.

Figure 5:
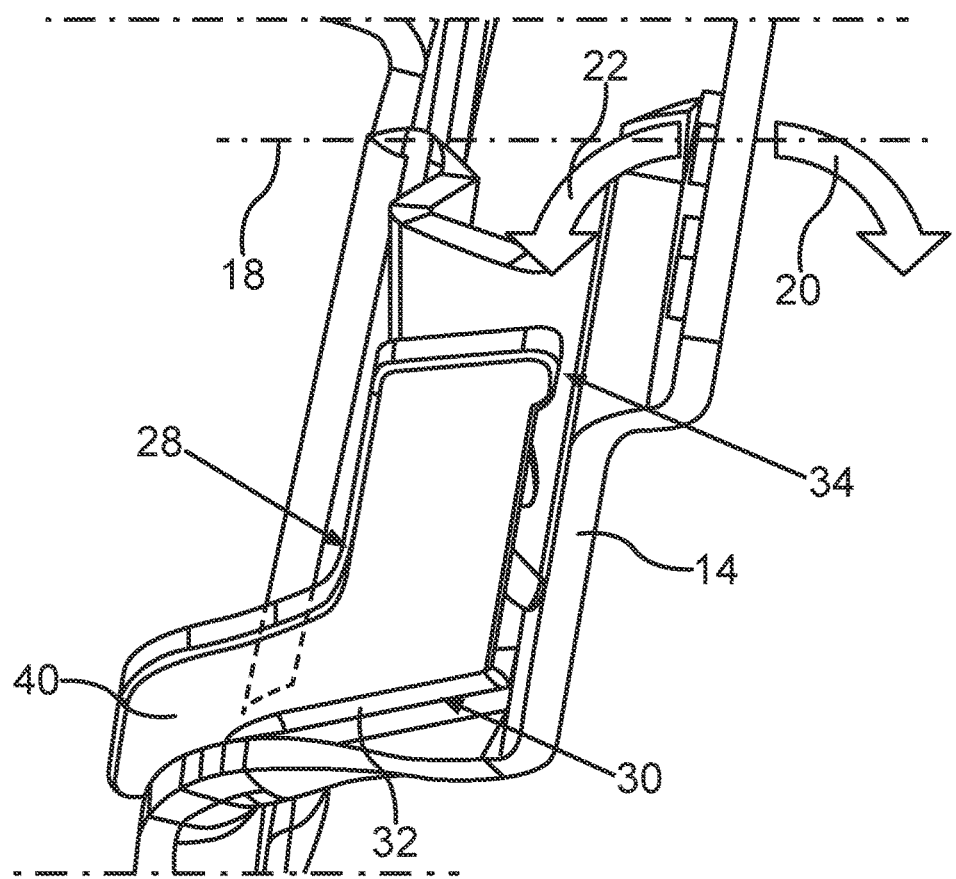
FIG. 5 shows, in perspective, the hinge lower part of the hinge according to FIG. 1 according to a variant.

Similar to FIG. 1, a bent arrow in FIG. 5 shows the first direction 20, in which the hinge lower part 14 can deform. Furthermore, it is clear from FIG. 5, just as with an impact force acting in the second direction 22, the deformation of the hinge lower part 14 toward the vehicle outer side is limited by the plate-like support element 28. The second direction 22 is also indicated by a bent arrow in FIG. 5.

With the variant of the hinge lower part 14 shown in FIG. 5 however, there is no cover arranged on the support element 28. Furthermore, a slight, for example about 2 mm, spacing between the limit stop area 34 and the hinge lower part 14 is also present in the non-deformed starting condition of the hinge lower part 14 shown in FIG. 5. Moreover, the support element 28 can be connected to the hinge lower part 14 over a large surface, namely along its narrow side fitting closely with the hinge lower part 14, in the attachment area 30, for example through welding. Accordingly, a sustained weld seam 32 is formed on the narrow side of the support element 28. Moreover, the support element 28 may have a step 40 in the attachment area 30 and be adapted accordingly, by the contour to the curve, which the hinge lower part 14 has in the attachment area 30.

Figure 6:
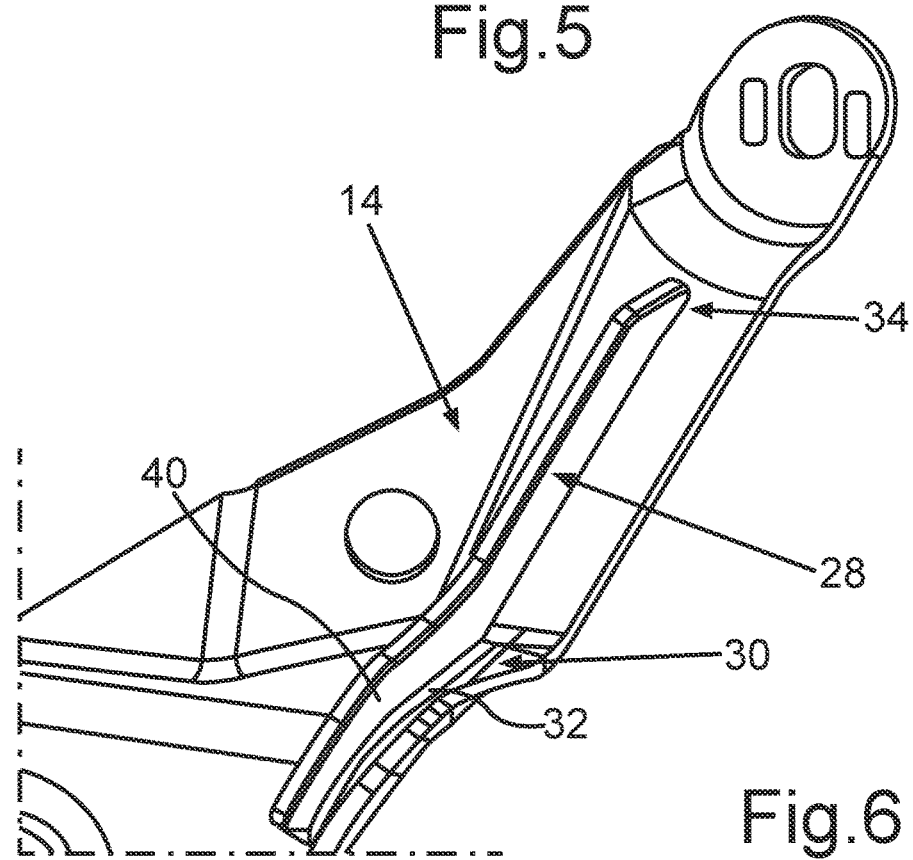
FIG. 6 shows a further perspective view of the hinge lower part according to FIG. 5.

The alignment of the support element 28 in the direction of the pivoting axis 18 can be seen especially well in FIG. 6.

The support element 28 can be attached in the attachment area 30 by means of welding on the side of the hinge lower part 14 to be suppressed, as shown by way of example here. In addition or as an alternative however, it may be provided that such a support is connected to the hinge lower part 14 by means of bolting. It is also possible to provide the support element 28 on the hinge lower part 14 through reshaping of the hinge lower part 14 and particularly to form the support element 28 with the hinge lower part 14 as a single part.

Moreover, it is possible to attach the at least one support element 28 to the body component, to which the hinge lower part 14 is attached, or to another body component close to the hinge. Furthermore, the support element 28 may be formed, for example, as a rib, wherein the part of the rib not attached to the hinge lower part 14 or to the body component forms the limit stop or limit stop area 34 for the hinge lower part 14.

With the hinge assembly 10 shown in FIGS. 1 to 6, the hinge lower part 14 is reinforced in the particular direction of movement, which is indicated in FIGS. 1 and 5 by the arrow showing the second direction 22.

Figure 7:
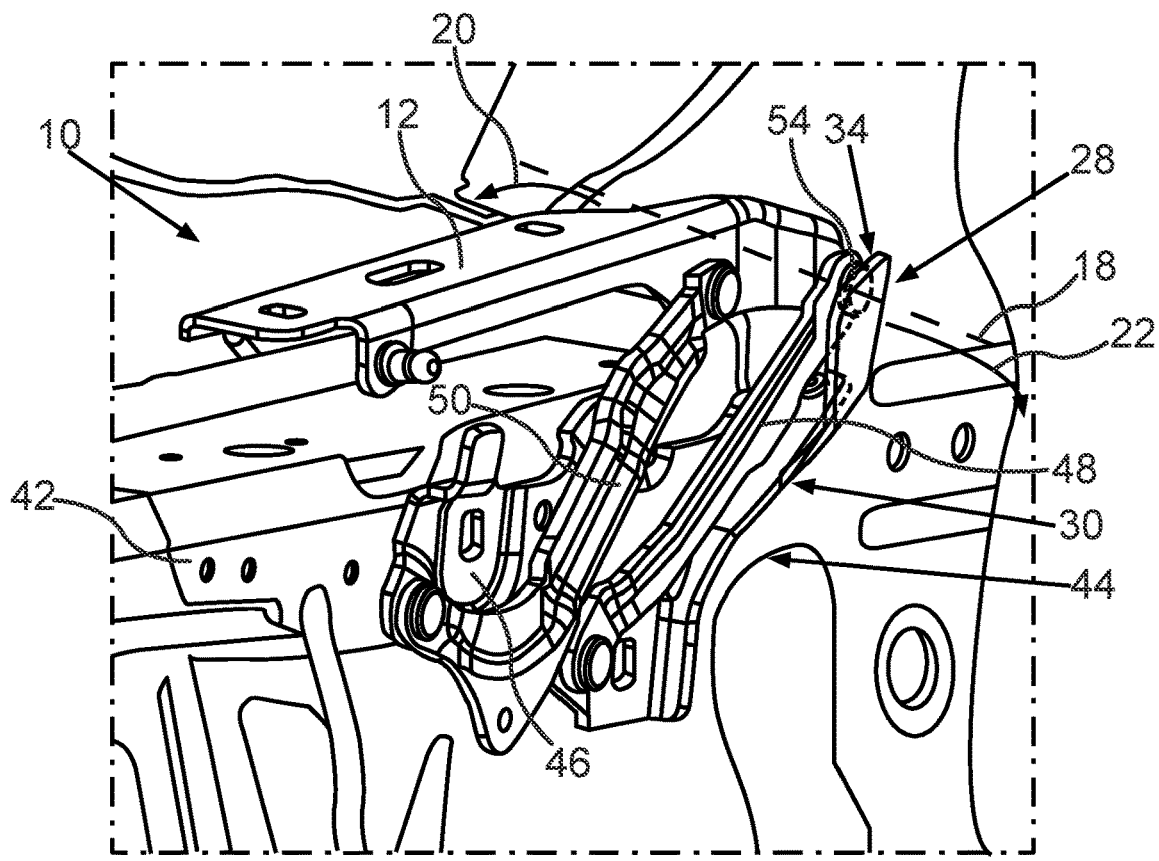
FIG. 7 shows, in perspective, a hinge assembly, in which a hinge substructure of a multi-pivot hinge comprises a hinge base body attached to a body component and two intermediate links, wherein a plate-shaped support element prevents buckling of one of the intermediate links toward the vehicle outer side.

With the hinge assembly 10 shown in FIG. 7, a hinge substructure 44 is provided by a plate-shaped hinge base body 46 as well as two intermediate links 48, 50. Accordingly, the hinge is formed here as a multi-pivot hinge to hinge the engine hood. The hinge upper part 12 is not directly retained so as to pivot on the hinge base body 46, which is connected to a body component, for example in the form of the side member 42. Instead, the hinge upper part 12 can be pivoted about the pivoting axis 18, which extends through a connection point, in which the intermediate link 48 is connected to the hinge upper part 12. In this case, the support element 28 limits deformation of the intermediate link 48 in the second direction 22 indicated by the arrow. In contrast, the intermediate links 48, 50 can deform in the opposite first direction 20, which is likewise indicated by a curved arrow in FIG. 7, unimpeded by the support element 28.

With the variant of the hinge assembly 10 shown in FIG. 7, the support element 28 is formed as a plate, which is aligned substantially vertically to the pivoting axis 18. In this case, the support element 28 is attached to the hinge base body 46 of the hinge substructure 44 in the attachment area 30.

Figure 8:
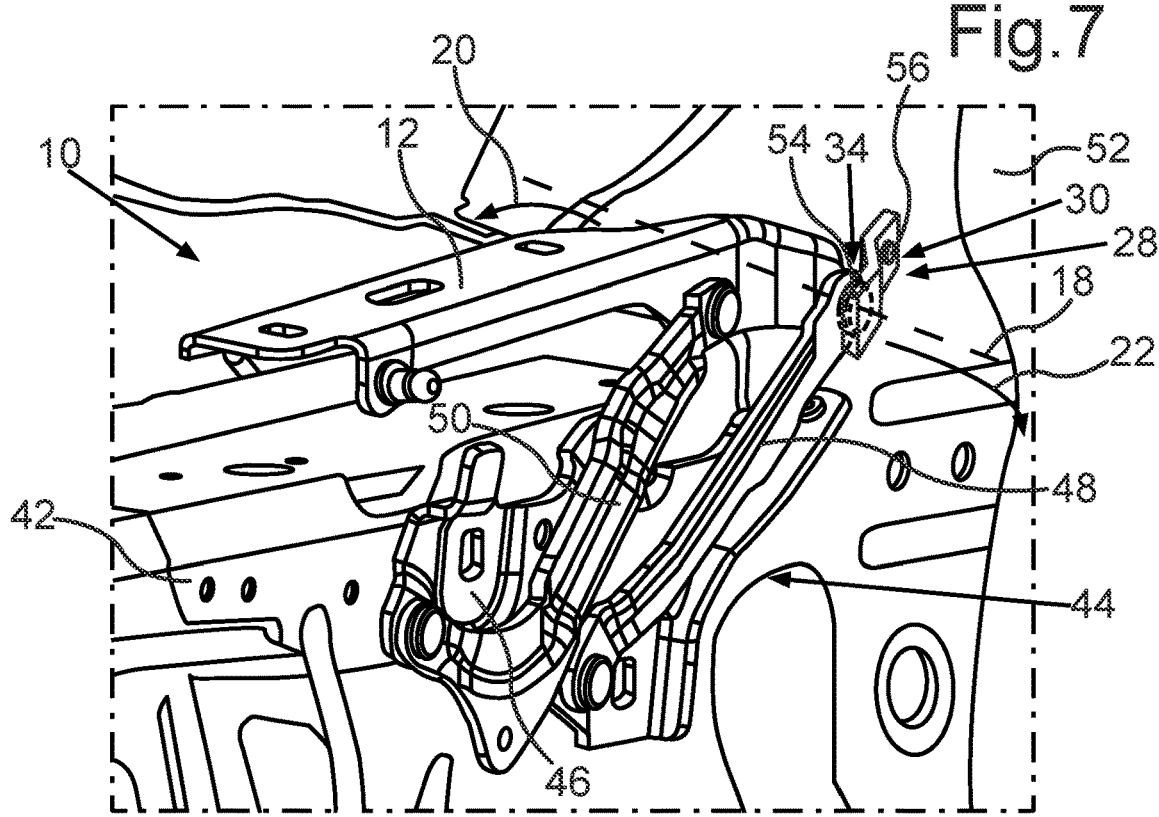
FIG. 8 shows a variant of the hinge assembly according to FIG. 7, in which the support element, which reinforces the multi-pivot hinge on one side, is arranged on a further body component.

With the variant of the hinge assembly 10 shown in FIG. 8, the support element 28 is attached to a further body component, for example to an A-pillar 52. This makes it possible, in particular, to attach the support element 28 after painting. Improved corrosion protection can be achieved by means of this coating of the support element 28. In addition, it is possible to mount the support element 28 or the support part very precisely without the formation of a gap. In particular, the support element 28 with the limit stop area 34 can thus fit closely with a bolt 54, by means of which the intermediate link 48 and the hinge upper part 12 are connected to one another so as to pivot about the pivoting axis 18.

With the hinge assembly 10 according to FIG. 8, the attachment area 30, in which the support element 28 is connected to the A-pillar 52, is arranged bent in relation to the limit stop area 34 of the support element 28. In particular, with this variant it is provided that there is a slight gap between the limit stop area 34 of the support element 28 and the bolt 54. This is because, with the four-pivot hinge shown, the hinge link or the intermediate link 48 moves away from the support element 28 when the engine hood is opened. When the support element 28 fits closely with the bolt 54 under pretension, the contact surface or the limit stop area 34 is thus preferably provided with a starting slope. The support element 28 here is connected to the further body component, for example in the form of the A-pillar 52, in the attachment area 30 by means of a bolt 56.

With this hinge assembly 10 as well, the support element 28 ensures that a movement of the hinge substructure 44, namely the intermediate links 48, 50, in the first direction 20 is enabled due to deformation. In contrast, the support element 28 suppresses the deformation of the hinge substructure 44 in the second direction 22. This is because the intermediate link 48 can move away from the limit stop area 34. However, the deformation of the intermediate link 48 in the second direction 22 is limited by means of the limit stop area 34.

Figure 9:
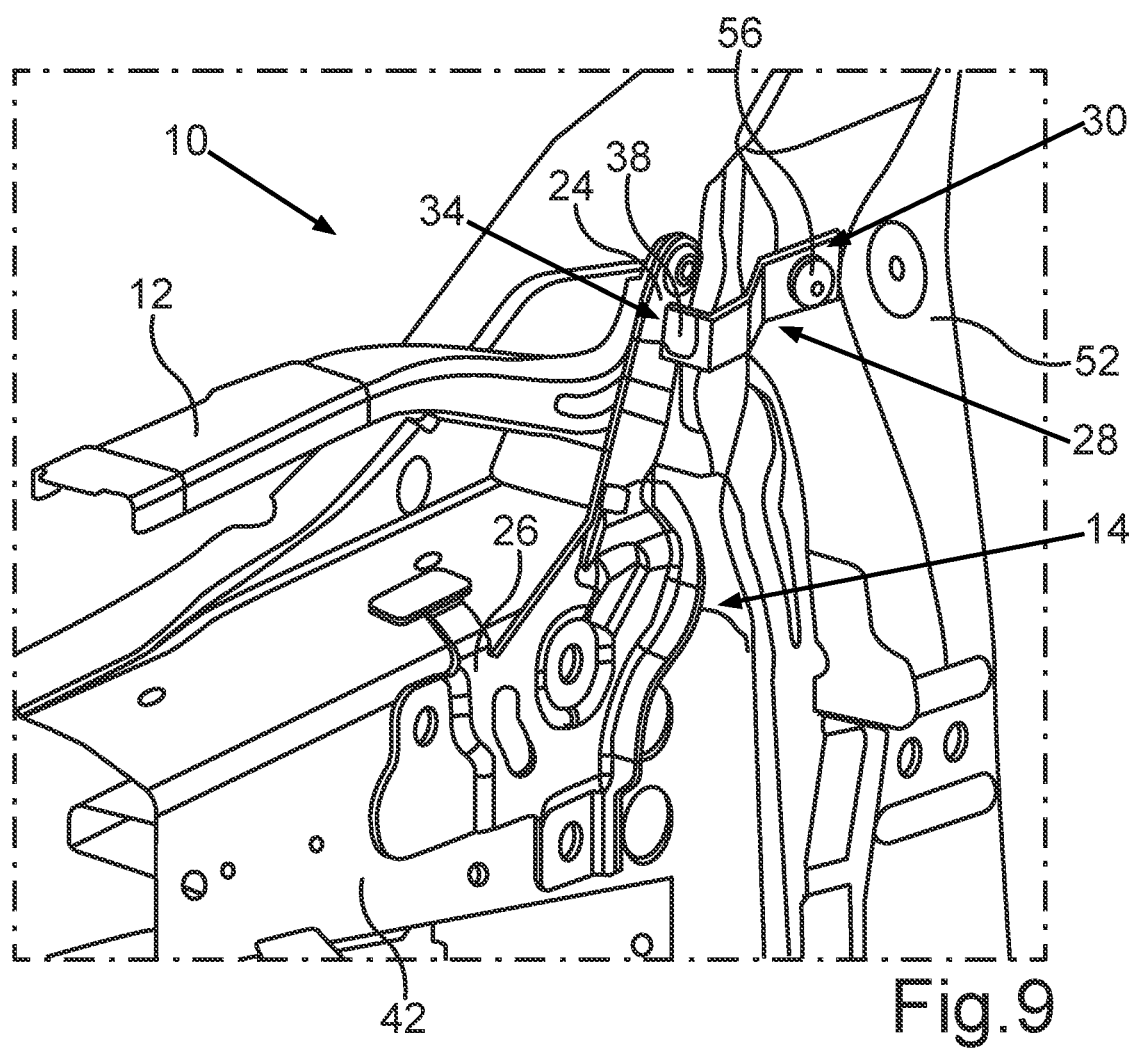
FIG. 9 shows a variant of the hinge assembly according to FIG. 1, in which the support element is not attached to the hinge lower part but instead to another body component.

With the variant of the hinge assembly 10 shown in FIG. 9 (just as with the hinge assembly 10 shown in FIG. 1), the hinge substructure of the single-pivot hinge, which is attached with the attachment section 26, for example, to the side member 42, is provided by the hinge lower part 14. However, the support element 28 is attached to a further body component, for example to the A-pillar 52 here. In this case, the support element 28 is attached to the A-pillar in the attachment area 30 by means of a bolt 56.

In this case as well (just as with the variant of the hinge assembly 10 shown in FIG. 8), the attachment area 30 is arranged bent as relates to the limit stop area 34 for the support element 28. In particular with this variant of the hinge assembly 10, it may be provided that the support element 28 fits closely with the end area 24 of the hinge lower part 14 under pretension. The limit stop area 34 of the support element 28, which may be provided particularly with the panel in the form of the cover 38 made of plastic according to FIG. 9, is aligned vertically to the end area 24 here. In contrast, the support element 28 fits closely with the A-pillar 52 flatly in the attachment area 30.

As a whole, the example shows how a one-sided stiffness increase in a hinge system can be achieved on the hinge lower part 14 and/or the hinge substructure 44 by means of the invention.

The invention claimed is:

1. A hinge assembly for an engine hood of a motor vehicle, comprising:
    a hinge substructure, which can be attached to a body component of the motor vehicle, and having a hinge upper part, which can be attached to the engine hood, wherein the hinge upper part is retained on the hinge substructure so as to pivot about a pivoting axis, the hinge substructure is deformable in a first direction toward a vehicle inner side and in a second direction toward a vehicle outer side;
    at least one support element including a limit stop area, wherein the hinge substructure is deformable in the first direction, wherein the at least one support element limits deformation of the hinge substructure in the second direction by way of the limit stop area such that a deformation in the first direction is greater than a deformation in the second direction,
    wherein the at least one support element is connected to the hinge substructure to the body component and to a further body component in an attachment area spaced apart from the limit stop area on the vehicle outer side.

2. The hinge assembly according to claim 1, wherein the hinge substructure is formed as a hinge lower part of a single-pivot hinge or comprises a hinge base body, which can be attached to the body component of the motor vehicle, and at least one intermediate link, which is connected so as to pivot with the hinge base body on one side and connected so as to pivot with the hinge upper part on the other side, wherein the at least one support element enables the deformation of the at least one intermediate link in the first direction and limits the deformation in the second direction by means of the limit stop area.

3. The hinge assembly according to claim 1, wherein the at least one support element is formed as a plate, which is aligned in a direction of the pivoting axis.

4. The hinge assembly according to claim 1, wherein the at least one support element, which is equipped with corrosion protection, and which is connected to the body component and the further body component, along with the limit stop area fits closely with the hinge substructure.

5. The hinge assembly according to claim 1, wherein the at least one support element is formed as a single piece with the hinge substructure and with the body component and is connected with the hinge substructure and with the body component with friction-locking or by at least one connecting element.

6. The hinge assembly according to claim 1, wherein the at least one support element comprises a metallic base body, which is provided with a panel attached to the base body in the limit stop area, said panel fitting closely with the hinge substructure.

7. The hinge assembly according to claim 6, wherein the panel is formed as a cover formed from at least one plastic and/or at least the base body of the at least one support element is formed as a single part with the hinge substructure and/or with the body component.

* * * * *